May 27, 1924.
J. H. NAYLOR
1,495,495
AUTOMATIC CUT-OFF VALVE FOR VACUUM PIPE LINES
Filed Oct. 21, 1922
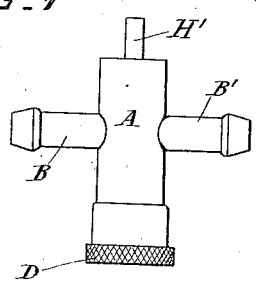
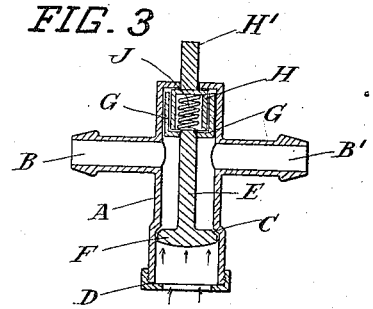
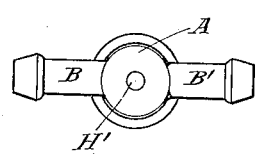
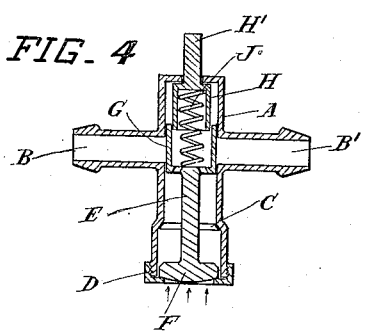
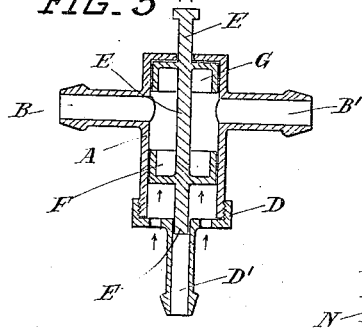
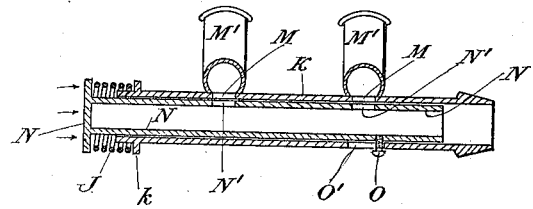
Inventor:
James Henry Naylor Patented May 27, 1924.

1,495,495

UNITED STATES PATENT OFFICE.

JAMES H. NAYLOR, OF MASTERTON, NEW ZEALAND.

AUTOMATIC CUT-OFF VALVE FOR VACUUM PIPE LINES.

Application filed October 21, 1922. Serial No. 595,926.

*To all whom it may concern:*

Be it known that I, JAMES HENRY NAYLOR, a subject of the King of Great Britain, residing at Renall Street, Masterton, New Zealand, have invented new and useful Improvements in Automatic Cut-Off Valves for Vacuum Pipe Lines, of which the following is a specification.

The object of the present invention is to provide an improved construction of valve for interposition within a vacuum pipe line, in order to allow for the automatic closing of such line against the entry of an excess of air should the vacuum prevailing in the line be reduced below a fixed normal degree. My invention is of particular use in milking machine installations of the class in which teat cups are connected by a branch pipe line with a vacuum main to draw the milk from the teats and convey it through such branch to the milk receiver. These teat cups in use are liable to drop from the teats so that there is a large inrush of air that destroys the vacuum in the system. If other cows are being milked at the same time the teat cups thereon then lose their grip and also drop off, with the result that the whole installation is put out of working order, and the teat cups are liable to become dirtied by dropping onto the floor and any loose dirt is liable to be drawn in through them, into the system, contaminating the milk.

The cut off devised, in its application to such a milking system, has been designed to be arranged at any convenient position in the teat cup branch, but preferably on or adjacent to the usual claw to which the four teat cups of each set are connected, and it operates in such a way as to keep the way through such branch fully open, so long as the vacuum in the connections is maintained, but immediately the vacuum is destroyed by the entry of air into one or more of the teat cups, it closes the branch thus sealing it against the continued inflow of air to destroy the vacuum of the system.

My invention therefore consists in a construction of valve that embodies within it a valve plunger adapted to open or close the connections of the teat cups with the branch, that is kept open by the action of atmospheric pressure acting on one end thereof, while vacuum prevails at the other end, and which is controlled by mechanical or other means such that when the vacuum is destroyed and the air pressure balanced, the plunger is moved to shut off such connections from that particular branch.

In the accompanying drawings three embodiments of my invention are shown, in two of which the plunger is controlled by means of a spring contained within the valve, while in the third, it is controlled by a bye pass connection with the vacuum main.

In the drawings:—

Figure 1 is an elevation of a spring-controlled valve adapted to be interposed within the vacuum branch line.

Figure 2 is a plan thereof.

Figure 3 is a sectional elevation showing the valve open.

Figure 4 is a similar view showing the valve closed.

Figure 5 is a sectional elevation of a valve constructed for vacuum control.

Figure 6 is a longitudinal section of the milk tube of a teat cup claw having the spring-controlled valve embodied therein.

According to Figures 1 to 4, the valve is formed by a cylindrical casing A having nipple tubular branches B and B' opening from it at points diametrically opposite one another and at a suitable distance from the top end of the casing. These branches extend in the same line and form the milk way through the valve. They are adapted to be connected respectively with the broken ends of the milking branch from the vacuum main.

The upper end of the cylinder A is closed while its lower end is opened and is formed at a short distance in from the end, with a valve seat C. A screw cap D having a large central opening is provided, and is screwed over the open lower end of the cylinder A to retain the plunger valve in place within the cylinder.

The plunger valve is formed by a stem E having a circular flat valve head F fixed to its lower end and a hollow piston G fixed to its upper end and made to make a neat sliding fit within the upper end of the casing A. The valve head F is also made to make a neat fit within the lower end of the casing and is designed to fit from beneath upon the valve seat C so as to seal the opening into the upper part of the casing. The piston G is made of such a length that it is capable of extending across the openings into the branches B and B' when moved in, while the several parts of the casing and of the plunger are made of such relative sizes that the piston G may rise in the casing above the level of the branch openings and when in this position, the valve head F will engage the seat C, as shown in Figure 3. When the plunger is pushed down to cause the valve head F to engage the cap D, the piston G will occupy a position closing the branch openings, as shown in Figure 4.

Fitted into the top of the hollow piston G is a guide formed by an inverted cup H which may have an upwardly projecting central stem H' that passes out through the closed top of the casing. Arranged in the space between the top of the guide and the bottom of the piston, is the helical spring J which is placed in compression and has a normal tendency to expand and push the piston down to its lower position.

The strength of the spring J is so arranged relatively to the surface area of the valve head F that it will be overcome by the atmospheric pressure acting on the outer face of said valve head when a vacuum prevails in the branches B and B' and in the casing A, so that such air pressure will then push the plunger up to the position shown in Figure 3 and maintain it there in order that milking may proceed. When however the vacuum is broken by the entry of air and sufficient air enters the casing A, that, together with the spring's energy will overcome the outside atmospheric pressure, and the spring J will act and force the plunger down to the position shewn in Figure 4, to close the main way against the passage of air into it. The valve may thus be regulated to close automatically immediately the degree of vacuum in the connections falls below a certain fixed degree, by regulating the strength of the spring J.

When the valve is to be opened again, the operator may press with his finger on the valve head F and lift the plunger until it raises the piston G sufficiently to connect the casing A with the branches B, B', when if a vacuum prevails in such branches, the air pressure will be free to act upon the head F and raise the plunger to its full extent. If it is desired to close the valve mechanically for any purpose the stem H' of the guide H when such is provided will be pressed on by the operator's finger whereby the guide and plunger will be forced down together.

In the form of valve shown in Figure 5 designed for vacuum control of the plunger's movement to shut off the branches, the cap D is made with a central nipple extension D' that is connected with the vacuum main and the stem E of the plunger is extended below the valve head F (which in this case is formed as a hollow piston) neatly fitting within the nipple. The spring J is omitted and the stem E is extended above the top of the piston G so as to project through the top of the casing and its upper end is broadened.

Atmospheric pressure acts on the underside of the piston F so that while a vacuum remains within the casing A, the plunger will be forced to the top end of the casing clear of the branches B and B'. Should the vacuum be destroyed the pressure on both sides of the hollow pistons will be the same, when by reason of the atmospheric pressure acting on the top area of the stem E, and its bottom area being in vacuum, the plunger will be forced down to its lower position to close the branches B, B'.

The construction shown in Figure 6 provides for the milk tube K of the ordinary teat cup claw acting as the casing for the plunger valve. This casing is formed with the usual ports M connecting with the cross tubes M' to which the teat cups are connected in the well known manner. The back end of the tube is left open and a long sleeve N is fitted into such end and adapted to slide to and fro therein. This sleeve is closed at its outer end and open at its inner end so that atmospheric pressure will act on the outside of the head thus formed, while the inside will be subject to the vacuum prevailing in the tube K. The sleeve is formed with two ports N' in it that are adapted at one limit of the sleeve's movement to be brought into register respectively with the ports M of the milk tube and thereby open up the branches M' to such tube, and to be moved away so that solid portions of the sleeve will extend across and close the ports M at the other limit of the sleeve's movement. These movements are limited by the pin O screwed into the sleeve N and passing through a longitudinal slot O' in the tube K.

A helical spring J is arranged around the outside of the outer sleeve end and is confined between such end and a collar $k$ on the end of the milk tube. This spring is in compression such as to normally force the sleeve outward to the second of the positions mentioned, but is overcome by the atmospheric pressure on the end of the sleeve when a vacuum prevails within the tube $k$, so that the sleeve is forced in to the first of the mentioned positions and retained there. When the vacuum is destroyed or decreased in degree to the required extent, the spring will act and force the sleeve out to close the branches M' from the pipe line, in the manner required.

I claim:—

1. In combination with a vacuum pipe line, an automatic cut off valve comprising a cylindrical casing open at one end and closed at the other end and provided with connections to said pipe line and a plunger valve movably fitted in the said casing, at one limit of its movements cutting off communication with the said pipe line, at the other limit opening communication therewith, the said plunger valve being continuously exposed to atmospheric pressure at its one end and to the vacuum prevailing in the said pipe line at its other end, and means for moving the said plunger valve to the cut off position upon the air pressures on its two ends being about balanced.

2. In combination with a vacuum pipe line, an automatic cut off valve comprising a cylindrical casing open at one end and closed at the other end and provided with connections to said pipe line and a plunger valve movably fitted in the said casing, at one limit of its movements cutting off communication with the said pipe line, at the other limit opening communication therewith, the said plunger valve being continuously exposed to atmospheric pressure at its one end and to the vacuum prevailing in the said pipe line at its other end, and a spring acting on the said plunger valve tending to move it to its cut off position.

3. In combination with a vacuum pipe line, an automatic cut off valve comprising a cylindrical casing open at one end and closed at the other end and having connections to said pipe line, and a plunger valve movably fitted in said casing, at one limit of its movements cutting off communication with the said pipe line and at the other limit opening communication therewith, a valve head on the end of the said plunger valve adjacent to the open end of the said casing and exposed to atmospheric pressure on its outside and to the vacuum prevailing in said pipe line on its inside, and a spring acting on the other end of said plunger valve tending to force the said valve head into the open end of the said casing upon the air pressures on the two sides of the said valve head being about balanced.

4. The combination as set forth in claim 3, comprising a presser cap provided between the closed end of the said casing and the adjacent end of the said plunger valve and enclosing the said spring, and a stem extending from the said cap outwards through the closed end of the said casing.

In testimony whereof, I affix my signature.

J. H. NAYLOR.